(12) United States Patent
Hiramatsu (10) Patent No.: US 8,988,541 B2
(45) Date of Patent: Mar. 24, 2015

(54) IMAGE PICKUP APPARATUS

(75) Inventor: Makoto Hiramatsu, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 13/099,846

(22) Filed: May 3, 2011

(65) Prior Publication Data

US 2011/0273574 A1 Nov. 10, 2011

(30) Foreign Application Priority Data

May 10, 2010 (JP) ................................ 2010-107932

(51) Int. Cl.
*H04N 5/235* (2006.01)
*H04N 5/232* (2006.01)
*G03B 3/10* (2006.01)
*G03B 7/00* (2014.01)
*G03B 7/20* (2006.01)
*G03B 13/34* (2006.01)
*G03B 13/36* (2006.01)

(52) U.S. Cl.
CPC .............. *H04N 5/23293* (2013.01); *G03B 3/10* (2013.01); *G03B 7/00* (2013.01); *G03B 7/20* (2013.01); *G03B 13/34* (2013.01); *G03B 13/36* (2013.01); *H04N 5/23296* (2013.01)
USPC ...................................................... 348/221.1

(58) Field of Classification Search
CPC .......... H04N 5/23293; H04N 5/23296; H04N 2201/0089; H04N 5/2352
See application file for complete search history.

(56) References Cited

U.S. PATENT DOCUMENTS

| | | | | |
|---|---|---|---|---|
| 5,282,045 | A | * | 1/1994 | Mimura et al. ................ 348/352 |
| 6,356,304 | B1 | * | 3/2002 | Kawaguchi et al. ........ 348/222.1 |
| 8,269,879 | B2 | * | 9/2012 | Sugimoto ...................... 348/349 |
| 2006/0012702 | A1 | * | 1/2006 | Kawahara et al. ............ 348/345 |
| 2009/0244325 | A1 | * | 10/2009 | Honjo et al. ............. 348/231.99 |

FOREIGN PATENT DOCUMENTS

| | | |
|---|---|---|
| CN | 101102414 A | 1/2008 |
| CN | 101326815 A | 12/2008 |
| JP | 04-086628 A | 3/1992 |
| JP | 05-297433 | 11/1993 |

(Continued)

OTHER PUBLICATIONS

Apr. 1, 2013 Chinese Office Action that issued in Chinese Patent Application No. 201110120673.7.

(Continued)

*Primary Examiner* — Luong T Nguyen
(74) *Attorney, Agent, or Firm* — Cowan, Liebowitz & Latman, P.C.

(57) ABSTRACT

An image pickup apparatus has a live view mode, and includes a computer configured to adjust an aperture value of an image pickup optical system so as to maintain constant a depth of field when a zoom position of the image pickup optical system is changed. In response to a signal indicative of an increase of the zoom position, the computer in the live view mode is configured to output a signal used to increase the aperture value and a signal used to increase a gain of the image pickup element, and to make the display unit display the image data with a changed zoom position, a changed aperture value, and a changed gain. In response to an instruction to obtain a still image, the computer is configured to obtain the still image with the changed zoom position, the changed aperture value, and the changed gain.

10 Claims, 7 Drawing Sheets

(56) References Cited

FOREIGN PATENT DOCUMENTS

| JP | 05-297433 A | 11/1993 |
|----|-------------|---------|
| JP | 2003-131115 A | 5/2003 |
| JP | 2004-096392 A | 3/2004 |
| JP | 2006-091915 A | 4/2006 |

OTHER PUBLICATIONS

Jan. 21, 2014 Japanese Office Action that issued in Japanese Patent Application No. 2010-107932.

* cited by examiner

IMAGE PICKUP APPARATUS

BACKGROUND OF THE INVENTION

1. Field of the Invention

The present invention relates to an image pickup apparatus, such as a video camera.

2. Description of the Related Art

Conventionally, there is known an image pickup apparatus having a live view mode configured to continuously output image data from an image pickup element and to display it on a display unit. It is also known to detect an object and its motion from an output of the image pickup element and to provide autofocusing (AF). Moreover, Japanese Patent Laid-Open No. ("JP") 05-297433 proposes an image pickup apparatus configured to calculate an aperture value that provides a set depth of field, and to adjust exposure through a shutter speed while the stop is set to the calculated aperture value.

JP 05-297433 maintains constant the depth of field and thus the blur degree of an object to be followed does not change. However, an exposure time period of the image pickup element varies, and the object may not be followed because blurs of the object, etc. can change.

SUMMARY OF THE INVENTION

The present invention provides an image pickup apparatus having a high detection precision of an object.

An image pickup apparatus according to the preset invention has a live view mode configured to continuously output image data from an image pickup element and to display the image data on a display unit, and includes a computer configured to adjust an aperture value of an image pickup optical system so as to maintain constant a depth of field when a zoom position of the image pickup optical system is changed. In response to a signal indicative of an increase of the zoom position, the computer in the live view mode is configured to output a signal used to increase the aperture value and a signal used to increase a gain of the image pickup element, and to make the display unit display the image data with a changed zoom position, a changed aperture value, and a changed gain. In response to an instruction to obtain a still image, the computer is configured to obtain the still image with the changed zoom position, the changed aperture value, and the changed gain.

Further features of the present invention will become apparent from the following description of exemplary embodiments with reference to the attached drawings.

DESCRIPTION OF THE EMBODIMENTS

Referring now to the accompanying drawings, a description will be given of an embodiment of the present invention.

First Embodiment

Figure 1:
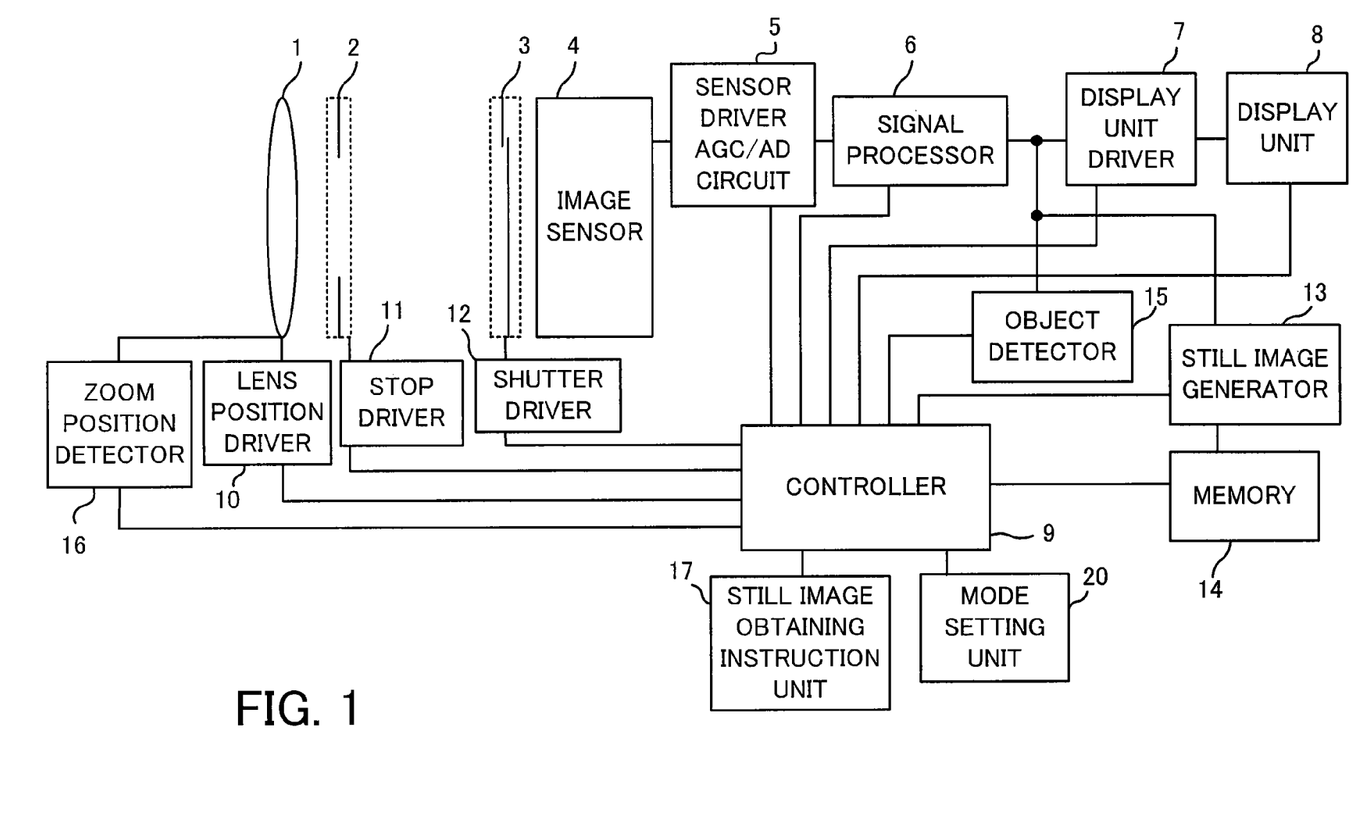
FIG. 1 is a block diagram of an image pickup apparatus according to first to third embodiments.

FIG. 1 is a block diagram of an image pickup apparatus of a first embodiment, such as a digital video camera and a digital still camera. The image pickup apparatus of this embodiment is an image pickup lens integrated type, but the lens unit may be detachable from the camera body. In this case, an image pickup optical system, a lens position driver 10, a stop driver 11, a shutter driver 12, and a zoom position detector 16, which will be described later, are provided to the lens unit, and a lens microcomputer of the lens unit communicates with a controller 9 as a camera microcomputer, which will be described later.

The image pickup apparatus of this embodiment includes a lens 1, a stop 2, and a shutter 3 that serve as the image pickup optical system, and forms an optical image of an object on an image sensor 4 via the image pickup optical system.

The lens 1 includes a zoom lens configured to move in an optical-axis direction at the zooming (focal length adjusting) time, and a focus lens configured to move in the optical-axis direction at the focusing time, and these lenses are moved or driven by the lens position driver 10. The position of the zoom lens is detected by the zoom (magnification variation) position detector 16. The stop 2 is driven by the stop driver 11, and its aperture value is adjustable. The shutter 3 is driven by the shutter driver 12, and its shutter speed is adjustable.

The image sensor 4 converts an optical image into an electric signal (image data), and is driven by a sensor driver and an AGC/AD circuit 5. In addition, a predetermined gain is applied to its output, and an image of the object is output as a digital signal. The output signal is processed as an image for display by a signal processor 6, sent to a display unit driver 7, and displayed as an image on the display unit 8.

The image pickup apparatus includes a mode setting unit 20 configured to set a live view mode that continuously outputs image data from the image sensor 4, and continuously displays the image data on the display unit 8, such as an electronic viewfinder.

The controller 9 is a camera microcomputer (CPU or processor) configured to adjust an aperture value of the image pickup optical system so as to maintain constant a depth of field when the zoom position of the image pickup optical system is changed in the live view mode. However, the present invention does not require the depth of field to be strictly constant.

The controller 9 recognizes setting of the live view mode based on a signal from the mode setting unit 20. In addition, the controller 9 obtains a signal indicative of an increase of the zoom position, from the zoom position detector 16 in the live view mode.

In response to the signal indicative of the increase of the zoom position, the controller 9 outputs a signal used to increase an aperture value to the stop driver 10 and a signal used to increase a gain of the image sensor 4 to the AGC/AD circuit 5. In this embodiment, the controller 9 makes the display unit 8 display the image with the changed zoom position, aperture value, and gain, and obtains a still image with this changed zoom position, aperture value, and gain in response to an instruction of obtaining a still image.

In another embodiment, the controller 9 communicates with the lens controller of the lens unit, and the lens controller sends a signal used to change the aperture value to the stop driver 10.

In the live view mode, the stop driver 11 drives the stop 2 based on the aperture value set by the controller 9, and the shutter driver 12 opens the shutter 3 in accordance with the instruction of the controller 9. In addition, the sensor driver 5 drives the image sensor 4 continuously in the exposure time period set by the controller 9, and the image on the image sensor 4 is displayed on the display unit 8 at any time.

Figure 2:
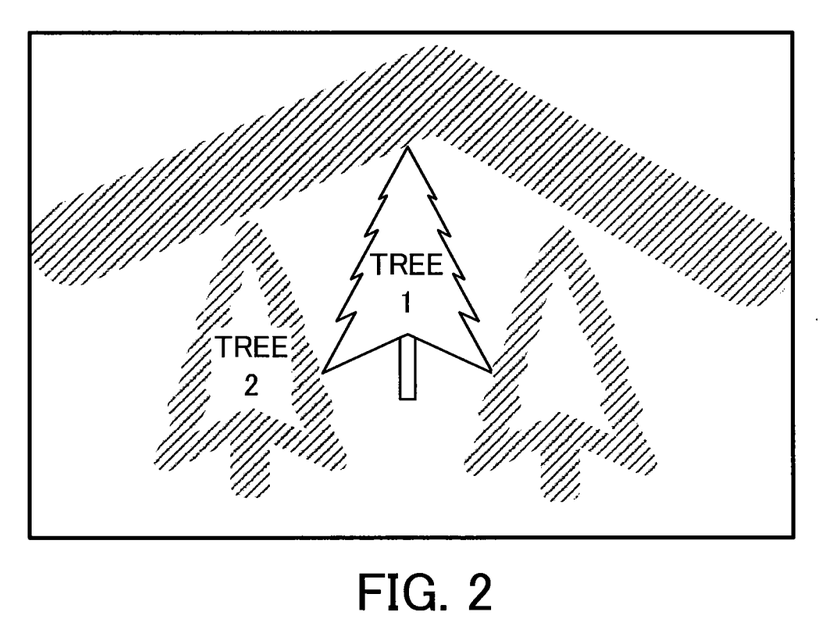
FIG. 2 is an image displayed on a display unit of the image pickup apparatus illustrated in FIG. 1 according to the first and second embodiments.

Now assume that a landscape is taken with a focal length of 50 mm, an aperture value F2.0, ISO speed 100, and a sensor exposure time period of 10 msec, and an image illustrated in FIG. 2 is obtained and displayed on the display unit 8. At this time, a tree 1 is focused.

When the zoom position is moved from M (mm) to N (mm) in the live view mode in this embodiment, the controller 9 changes an aperture value N/M times and a gain control $(N/M)^2$ times.

Figure 3:
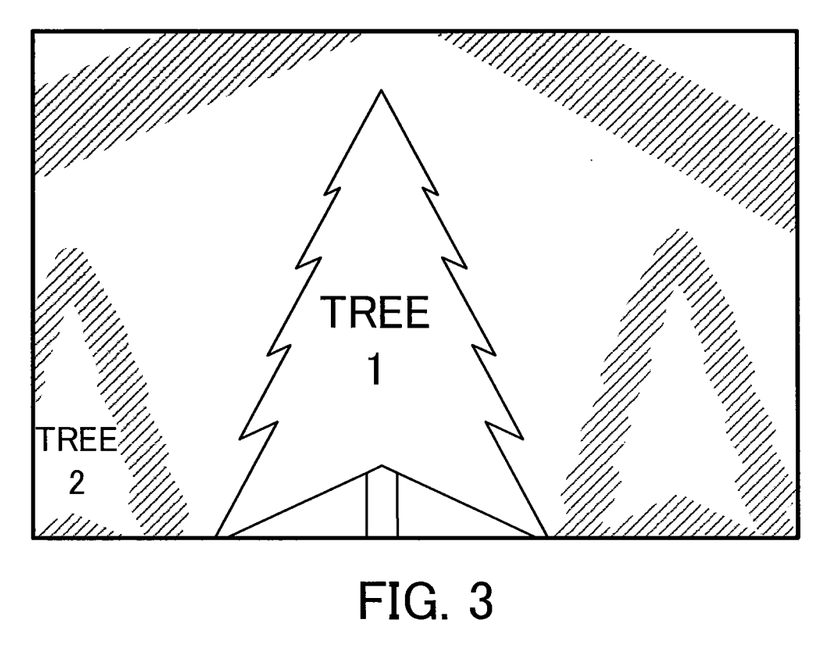
FIG. 3 is an image displayed on the display unit of the image pickup apparatus illustrated in FIG. 1 according to the first embodiment.

For example, when the focal length is zoomed up to 100 mm, the controller 9 detects this movement of the zoom position via the zoom position detector 16, and controls the stop driver 11 based on the zoom position and sets the aperture value to F4.0 (=2.0×100/50). In addition, the controller 9 increases the gain up to an amount corresponding to the ISO 400 by controlling the sensor driver and the AGC/AD circuit 5. As a result, an image is obtained as illustrated in FIG. 3, and displayed on the display unit 8 with the changed zoom position, aperture value, and gain.

However, the present invention is not limited to this embodiment that strictly sets the aperture value N/M times, and the gain control $(N/M)^2$ times. This is true of another embodiment.

When a still image obtaining instruction unit issues a still image obtaining instruction with a tree 2 as a main object to the controller 9, the controller 9 detects a position of the tree 2 via the object detector 15, confirms its in-focus position, and focuses on the tree 2 via the lens position driver 10. Since the depth of field is constant at this time, the blur degree of the tree 2 is constant before and after zooming and thus the object detector 15 can correctly detect the tree 2.

Thereafter, the controller 9 closes the shutter 3 via the shutter driver 12, and switches the sensor driver 5 into a still image obtaining action and the signal processor 6 into the processing for a still image. Thereafter, the shutter 3 is driven at a shutter speed of 1/100 via the shutter driver 12.

Figure 4:
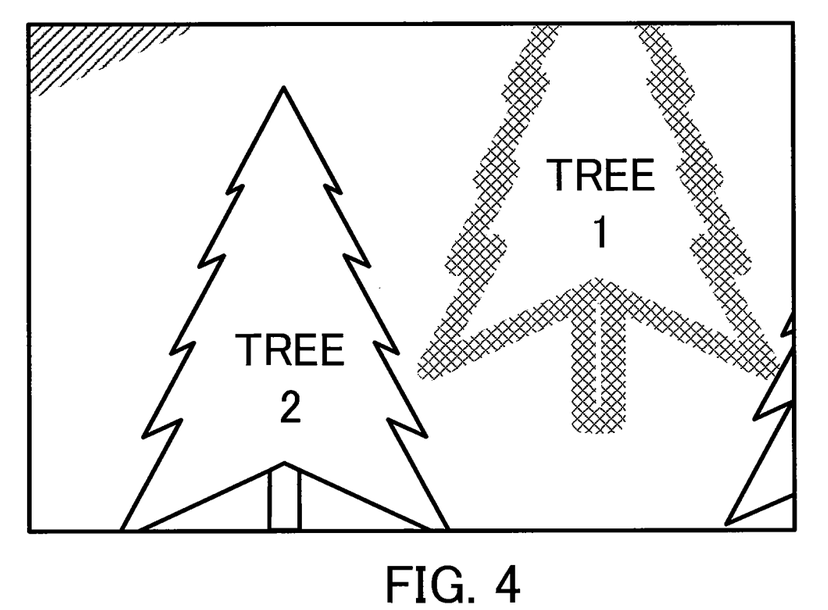
FIG. 4 is an image taken by the image pickup apparatus illustrated in FIG. 1 according to the first and second embodiments.

Thereby, the still image data obtained from the signal processor 6 is input into the still image generator 13, and a still image is obtained and stored as a still image file in the memory 14. This obtained image is good as illustrated in FIG. 4. While this embodiment uses the object detector 15, a photographer may designate an in-focus position.

Second Embodiment

The structure of an image pickup apparatus the second embodiment is the same as that of the first embodiment, and displaying on the display unit 8 in the live view mode is the same as that of the first embodiment. The processing to an instruction to obtain a still image is different from that of the first embodiment. In other words, in response to the instruction to obtain the still image in this embodiment, the controller 9 in the live view mode obtains a still image with the changed zoom position, the changed aperture value, and the pre-change gain. In addition, the controller 9 delays the shutter speed by an amount corresponding to an amount by which the gain is returned to the pre-change state.

Now assume that a landscape is taken with a focal length of 50 mm, an aperture value F2.0, ISO speed 1600, and a sensor exposure time period of 10 msec, and an image illustrated in FIG. 2 is obtained and displayed on the display unit 8.

When the zoom position is moved from M (mm) to N (mm) in the live view mode in this embodiment, the controller 9 changes an aperture value N/M times and a gain control $(N/M)^2$ times.

Figure 5:
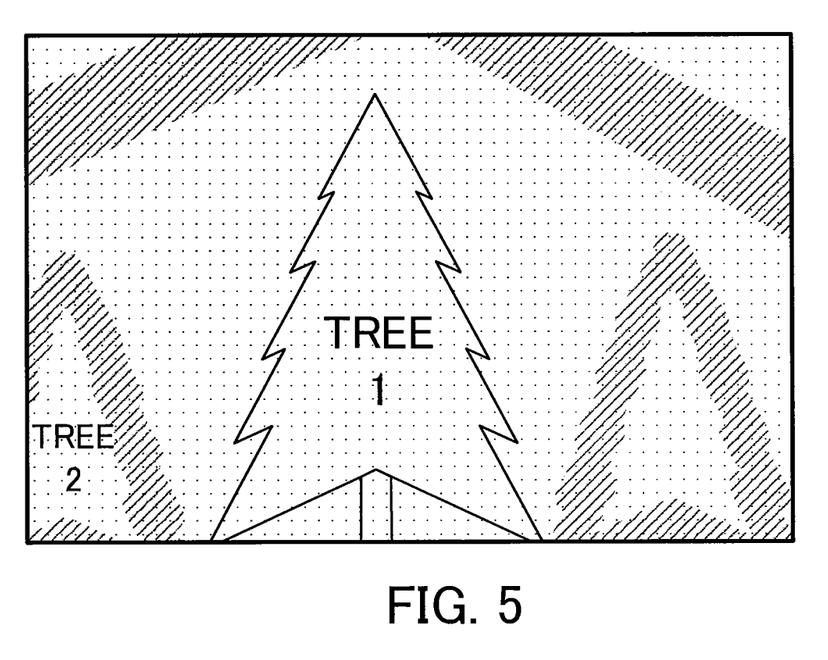
FIG. 5 is an image displayed on the display unit of the image pickup apparatus illustrated in FIG. 1 according to the second embodiment.

For example, when the focal length is zoomed up to 100 mm, the controller 9 detects this movement of the zoom position via the zoom position detector 16, and controls the stop driver 11 based on the zoom position and sets the aperture value to F4.0 (=2.0×100/50). In addition, the controller 9 increases the gain up to an amount corresponding to the ISO 6400 by controlling the sensor driver and the AGC/AD circuit 5. As a result, an image is obtained as illustrated in FIG. 5, and displayed on the display unit 8 with the changed zoom position, aperture value, and the gain.

Here, since the gain has been increased, the noises increase and the image quality may be deteriorated. Therefore, when the still image obtaining instruction unit 17 issues a still image obtaining instruction with a tree 2 as a main object to the controller 9, the controller 9 detects a position of the tree 2 via the object detector 15, confirms its in-focus position, and focuses on the tree 2 via the lens position driver 10. Since the depth of field is constant at this time, the blur degree of the tree 2 is constant before and after zooming and thus the object detector 15 can correctly detect the tree 2.

Thereafter, the controller 9 closes the shutter 3 via the shutter driver 12, and switches the sensor driver 5 into a still image obtaining action, returns the gain of the AGC/AD circuit 5 to a value corresponding to the ISO 1600, and switches the signal processor 6 into the processing for a still image. Thereafter, the shutter 3 is driven at a shutter speed of 1/25 via the shutter driver 12.

Thereby, the still image data obtained from the signal processor 6 is input into the still image generator 13, and a still image is obtained and stored as a still image file in the memory 14. In this case, the gain is returned to a value corresponding to the ISO 1600, and the noise at the high gain time can be reduced.

The controller 9 outputs a signal used to delay the shutter speed of the image pickup optical system corresponding to the changed zoom position and aperture value (or to delay the shutter speed four times in this embodiment). This delay does not change the brightness of the image.

Thereby, similar to the first embodiment, a still image illustrated in FIG. 4 can be obtained and a good image can be obtained even for a dark object. While this embodiment uses the object detector 15, a photographer may designate an in-focus position.

Third Embodiment

The structure of an image pickup apparatus the third embodiment is the same as that of the first embodiment. In this embodiment, the controller 9 calculates an in-focus position while performing a live view, and operates the lens position driver 10 so as to apply a servo AF to the object.

In this embodiment, the controller 9 serves as a detector configured to detect or calculate an in-focus position using the known phase difference detection method or contrast detection method. The detector 9 also serves as an AF unit configured to move the focus lens in the lens 1 in the image pickup optical system to the detected or calculated in-focus position via the lens position driver 10. Thereby, an in-focus position can be adjusted to the detected in-focus position at any time.

Figure 6:
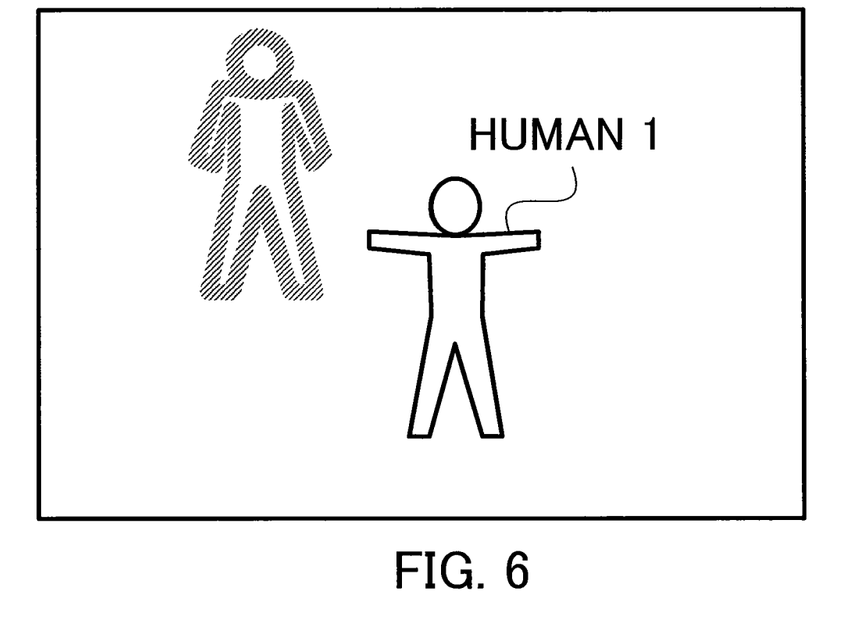
FIG. 6 is an image displayed on the display unit of the image pickup apparatus illustrated in FIG. 1 according to the third embodiment.

Now assume that a landscape is taken with a focal length of 50 mm, an aperture value F2.0, ISO speed 100, and a sensor exposure time period of 10 msec, and an image illustrated in FIG. 6 is obtained and displayed on the display unit 8, in which an in-focus position slightly shifts from a human 1.

When the zoom position is moved from M (mm) to N (mm) in the live view mode in this embodiment, the controller 9 changes an aperture value N/M times and a gain control $(N/M)^2$ times.

Figure 7:
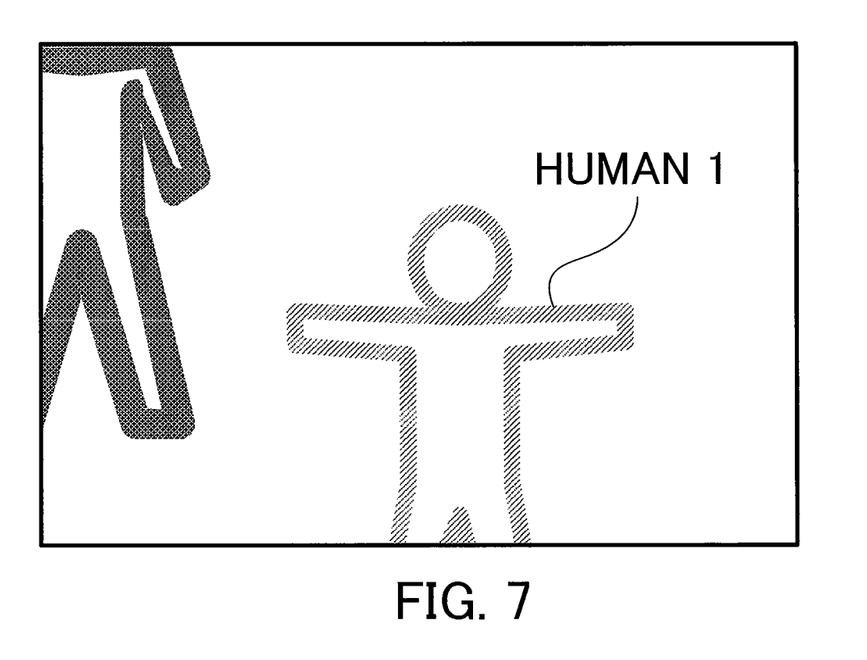
FIG. 7 is an image displayed on the display unit of the image pickup apparatus illustrated in FIG. 1 according to the third embodiment.

For example, when the focal length is zoomed up to 100 mm, the controller 9 detects this movement of the zoom position via the zoom position detector 16, and controls the stop driver 11 based on the zoom position and sets the aperture value to F4.0 ($=2.0 \times 100/50$). In addition, the controller 9 increases the gain up to an amount corresponding to the ISO 400 by controlling the sensor driver and the AGC/AD circuit 5. As a result, an image is obtained as illustrated in FIG. 7, and displayed on the display unit 8 with the changed zoom position, aperture value, and the gain.

Figure 8:
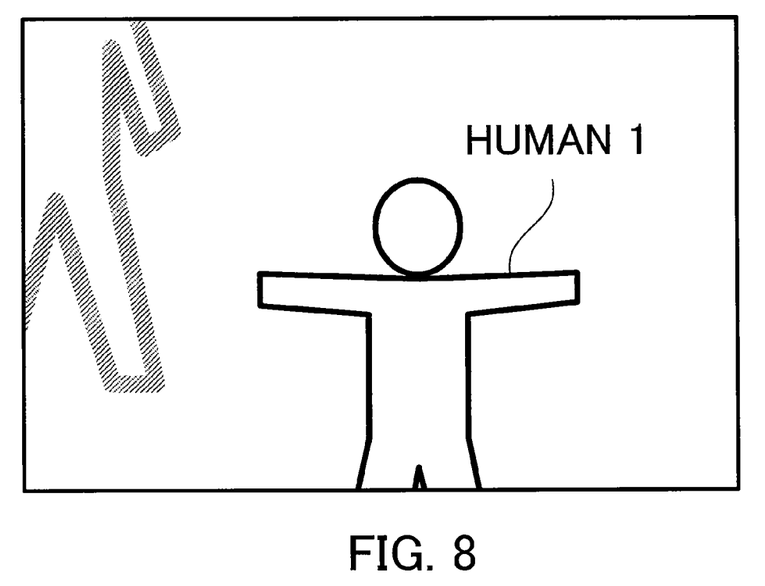
FIG. 8 is an image taken by the image pickup apparatus illustrated in FIG. 1 according to the third embodiment.

Next, the controller 9 calculates an in-focus position, and focuses on the human 1 via the lens position driver 10. As a result, a good image illustrated in FIG. 8 is obtained and displayed on the display unit 8.

When the still image obtaining instruction unit 17 issues a still image obtaining instruction with the human 1 as a main object to the controller 9, the controller 9 closes the shutter 3 via the shutter driver 12, and switches the sensor driver 5 into a still image obtaining action and the signal processor 6 into the processing for a still image. Thereafter, the controller 9 drives the shutter 3 at a shutter speed of $1/100$ via the shutter driver 12.

Thereby, the still image data obtained from the signal processor 6 is input into the still image generator 13, and a still image is obtained and stored as a still image file in the memory 14. The AF of this embodiment may be combined with the second embodiment.

Fourth Embodiment

Figure 9:
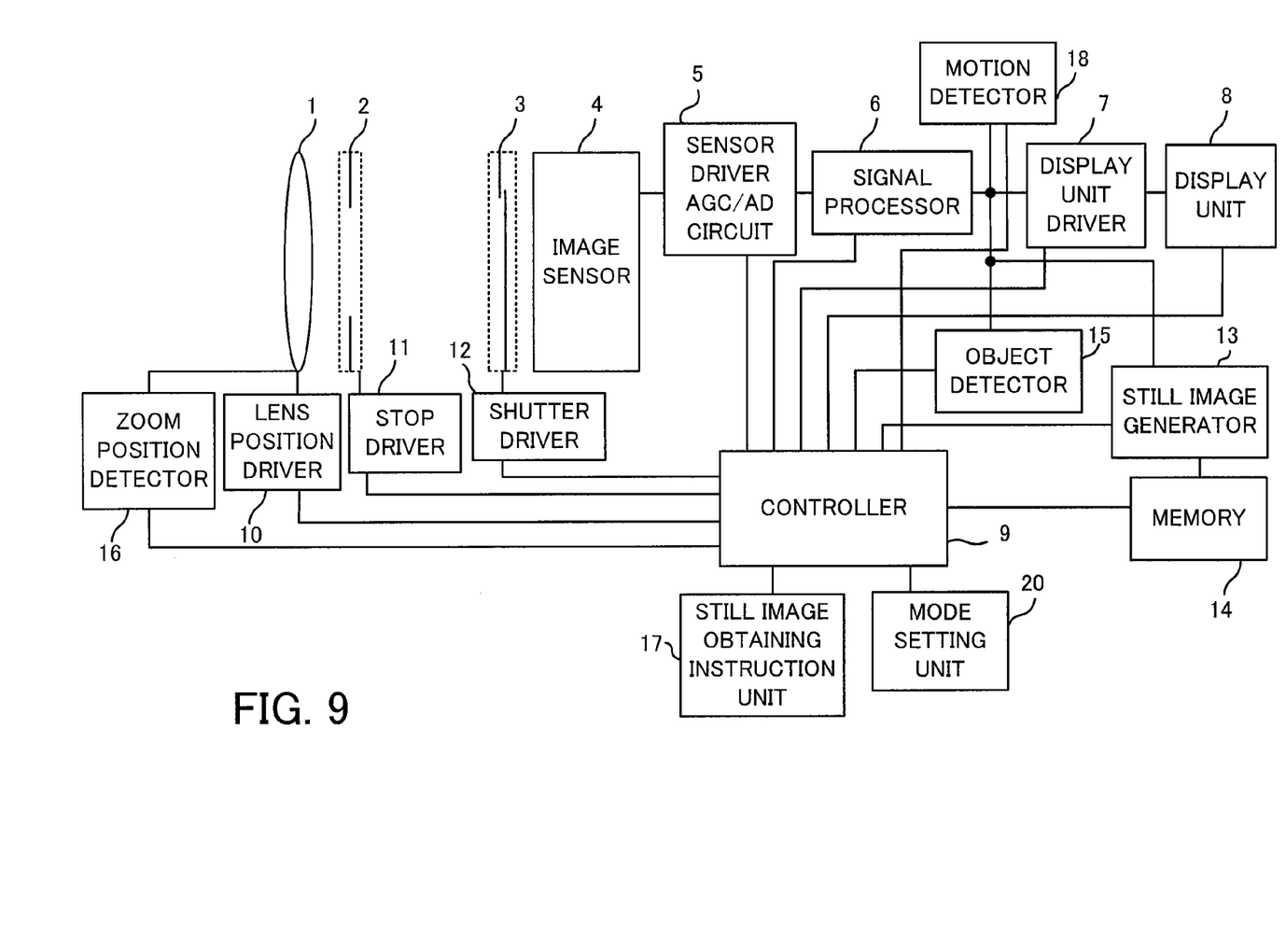
FIG. 9 is a block diagram of an image pickup apparatus according to a fourth embodiment.

FIG. 9 is a block diagram of an image pickup apparatus of a fourth embodiment. Those elements in FIG. 9, which are the corresponding elements in FIG. 1, will be designated by the same reference numerals. The image pickup apparatus illustrated in FIG. 9 further includes a motion detector 18 in the image pickup apparatus illustrated in FIG. 1.

Figure 10:
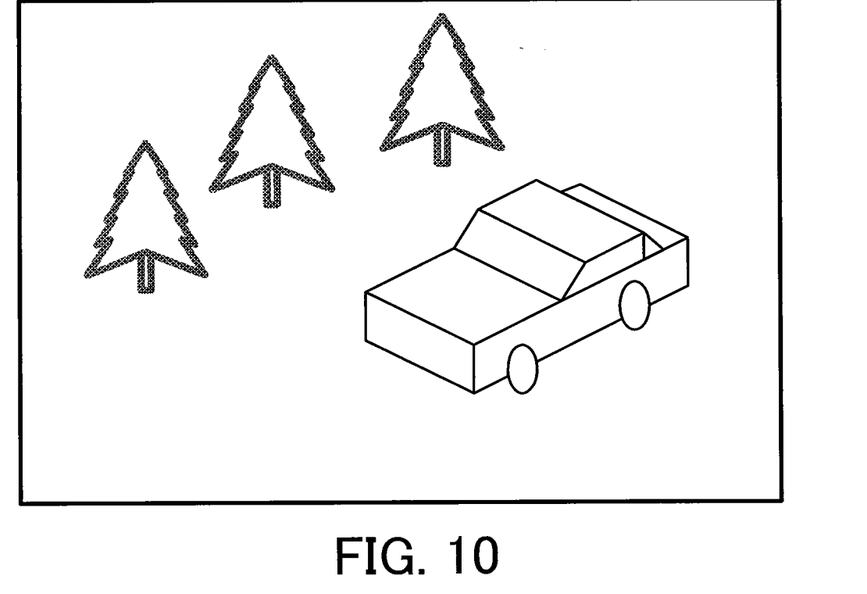
FIG. 10 is an image displayed on a display unit of the image pickup apparatus illustrated in FIG. 9 according to the fourth embodiment.

Now assume that a landscape is taken with a focal length of 50 mm, an aperture value F2.0, ISO speed 100, and a sensor exposure time period of 10 msec, and an image illustrated in FIG. 10 is obtained and displayed on the display unit 8.

When the zoom position is moved from M (mm) to N (mm) in the live view mode in this embodiment, the controller 9 changes an aperture value N/M times and a gain control $(N/M)^2$ times.

Figure 11:
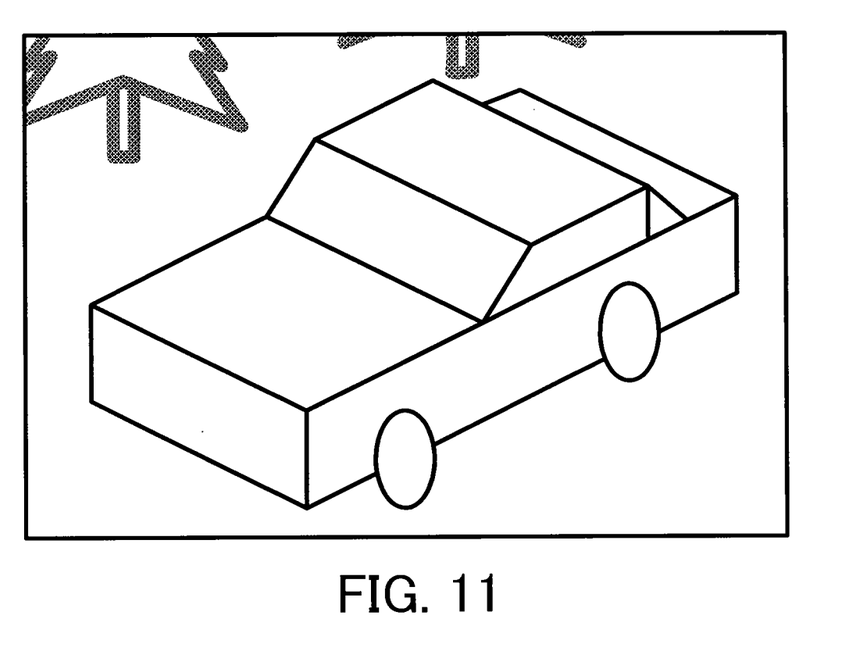
FIG. 11 is an image taken by the image pickup apparatus illustrated in FIG. 9 according to the fourth embodiment.

For example, when the focal length is zoomed up to 100 mm, the controller 9 detects this movement of the zoom position via the zoom position detector 16, and controls the stop driver 11 based on the zoom position and sets the aperture value to F4.0 ($=2.0 \times 100/50$). In addition, the controller 9 increases the gain up to the ISO 400 by controlling the sensor driver and the AGC/AD circuit 5. As a result, an image is obtained as illustrated in FIG. 11, and displayed on the display unit 8.

When the still image obtaining instruction unit 17 issues a still image obtaining instruction with a car as a main object to the controller 9, the controller 9 detects a position of the car via the motion detector 15 and a motion of the car via the motion detector 18. The controller 9 confirms its in-focus position, and focuses on the car via the lens position driver 10.

Since the depth of field is constant at this time, the blur degree of the car is constant before and after zooming and an exposure time period is constant. Thus, the object detector 15 can correctly detect the car and the motion detector 18 can correctly detect the motion.

Thereafter, the controller 9 closes the shutter 3 via the shutter driver 12, and switches the sensor driver 5 into a still image obtaining action and the signal processor 6 into the processing for a still image. Thereafter, the controller 9 drives the shutter 3 at a shutter speed of $1/100$ via the shutter driver 12. Moreover, the controller 9 predicts a motion of the car via the motion detector 18, and focuses on the position of the car when the shutter is running.

Thereby, the still image data obtained from the signal processor 6 is input into the still image generator 13, and a still image is obtained and stored as a still image file in the memory 14. In addition, an exposure time period becomes constant in the live view, a smoothly moving image can be output, and the object detector and the motion detector can be precisely operated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-107932, filed May 10, 2010 which is hereby incorporated by reference herein in its entirety.

What is claimed is:

1. An image pickup apparatus having a live view mode configured to continuously output image data from an image pickup element and to display the image data on a display unit, the image pickup apparatus comprising a computer configured to adjust an aperture value of an image pickup optical system so as to maintain constant a depth of field when a zoom position of the image pickup optical system is changed,
   wherein in response to a signal indicative of an increase of the zoom position, the computer in the live view mode is configured to output a signal used to increase the aperture value and a signal used to increase a gain of the image pickup element, and to make the display unit display the image data with a changed zoom position, a changed aperture value, and a changed gain, and
   wherein in response to an instruction to obtain a still image in the changed zoom position, the computer is configured to obtain the still image with controlled shutter speed based on the changed aperture value, and the changed gain.

2. The image pickup apparatus according to claim 1, wherein when a focal length is changed from M (mm) to N (mm) by a movement of the zoom position, the computer is configured to change the aperture value N/M times and a gain control $(N/M)^2$ times before displaying of the display unit.

3. The image pickup apparatus according to claim 1, further comprising:
a detector configured to detect an in-focus position; and
an autofocus unit configured to provide focusing by moving the image pickup optical system to the in-focus position detected by the detector.

4. The image pickup apparatus according to claim 3, further comprising:
an object detector configured to detect an object; and
a motion detector configured to detect a motion of the object detected by the object detector,
wherein the detector is configured to detect the in-focus position of the object in accordance with the motion of the object detected by the motion detector and the autofocus unit is configured to provide focusing based on the in-focus position.

5. An image pickup apparatus having a live view mode configured to continuously output image data from an image pickup element and to display the image data on a display unit, the image pickup apparatus comprising a computer configured to adjust an aperture value of an image pickup optical system so as to maintain constant a depth of field when a zoom position of the image pickup optical system is changed,
wherein in response to a signal indicative of an increase of the zoom position, the computer in the live view mode is configured to output a signal used to increase the aperture value and a signal used to increase a gain of the image pickup element, and to make the display unit display the image data with a changed zoom position, a changed aperture value, and a changed gain, and
wherein in response to an instruction to obtain a still image, the computer is configured to output a signal used to delay a shutter speed of the image pickup optical system corresponding to an amount by which the gain is returned to a pre-change state, and to obtain a still image with the changed zoom position, the changed aperture value, and a pre-change gain.

6. The image pickup apparatus according to claim 5, wherein when a focal length is changed from M (mm) to N (mm) by a movement of the zoom position, the computer is configured to change the aperture value N/M times and a gain control $(N/M)^2$ times before displaying of the display unit.

7. The image pickup apparatus according to claim 5, further comprising:
a detector configured to detect an in-focus position; and
an autofocus unit configured to provide focusing by moving the image pickup optical system to the in-focus position detected by the detector.

8. The image pickup apparatus according to claim 7, further comprising:
an object detector configured to detect an object; and
a motion detector configured to detect a motion of the object detected by the object detector,
wherein the detector is configured to detect the focus position of the object in accordance with the motion of the object detected by the motion detector and the autofocus unit is configured to provide focusing based on the in-focus position.

9. The image pickup apparatus according to claim 1, wherein the increase of the zoom position is an increase of a focal length.

10. The image pickup apparatus according to claim 5, wherein the increase of the zoom position is an increase of a focal length.

* * * * *